(12) United States Patent
Mitchell et al.

(10) Patent No.: US 6,517,773 B1
(45) Date of Patent: Feb. 11, 2003

(54) DIRECT METAL FABRICATION OF PARTS WITH SURFACE FEATURES ONLY

(75) Inventors: Michael R. Mitchell, Newbury Park, CA (US); Scott A. Schroeder, Newbury Park, CA (US); Mark R. Appleford, Newbury Park, CA (US); Keiko Anne Halchak, Los Angeles, CA (US); Brian R. Zambrano, Westlake Village, CA (US)

(73) Assignee: Innovative Technology Licensing, LLC, Thousand Oaks, CA (US)

( * ) Notice: Subject to any disclaimer, the term of this patent is extended or adjusted under 35 U.S.C. 154(b) by 0 days.

(21) Appl. No.: 09/404,227

(22) Filed: Sep. 23, 1999

(51) Int. Cl.[7] .................................................. B22F 3/12
(52) U.S. Cl. .............................. 419/47; 419/37; 419/38; 419/54
(58) Field of Search ............................. 419/36, 37, 38, 419/54, 47

(56) References Cited

U.S. PATENT DOCUMENTS

| | | | | |
|---|---|---|---|---|
| 1,988,861 A | * | 1/1935 | Thorausch et al. | 136/29 |
| 2,793,951 A | * | 5/1957 | Green et al. | 75/214 |
| 3,052,967 A | * | 9/1962 | Fischer | 29/182 |
| 5,624,631 A | * | 4/1997 | Luk | 419/23 |
| 5,682,591 A | * | 10/1997 | Inculet et al. | 419/38 |
| 5,745,834 A | | 4/1998 | Bampton et al. | 419/37 |
| 6,224,816 B1 | * | 5/2001 | Hull et al. | 264/401 |

OTHER PUBLICATIONS

Randall M. German, *Powder Metallurgy Science*, Second Edition, Metal Powder Industries Federation, pp. 274–275, (1994).

* cited by examiner

Primary Examiner—Daniel J. Jenkins
(74) Attorney, Agent, or Firm—Koppel, Jacobs, Patrick & Heybl

(57) ABSTRACT

A method of directly fabricating metal parts with surface features only requires first preparing a mold of the desired metal part. A powder blend is poured into the mold, which includes a base metal, a lower melting temperature alloy of the base metal, and a polymer binder. The mold containing the powder blend is heated until the polymer binder melts and adheres the metal particles to form a green part. The green part is removed from the mold and placed in a crucible, and loose ceramic powder is packed around the part to support it. The supported green part is then heated as needed to vaporize the binder and consolidate the part via liquid phase sintering. Once cool, the consolidated part can be machined to meet precise dimensional tolerances, if necessary.

16 Claims, 3 Drawing Sheets

DIRECT METAL FABRICATION OF PARTS WITH SURFACE FEATURES ONLY

BACKGROUND OF THE INVENTION

1. Field of the Invention

This invention relates to the field of metal part fabrication, and particularly to the direct metal fabrication of parts with surface features only.

2. Description of the Related Art

Many techniques have been developed for fabricating metal parts. Some parts, such as metal stamping dies, have surface features only; i.e., with no re-entrant angles at the part's side faces. Historically, such parts have been machined by removing material from a block to form a final part. However, machining is both time-consuming and expensive, and is rarely cost efficient when done on a production scale. More typically, large scale production uses a casting process that is fairly time and cost efficient and produces cast quality final parts. However, the cost of retooling and machining a new part can be very high, both in dollar and man hour investment, and in the delay in getting a new design into production. This can be a significant deterrent to updating and improving the design of the part.

Alternatives to machining and casting have been developed in recent years. U.S. Pat. No. 5,745,834 to Bampton et al. and assigned to Rockwell International, the Assignee of the present invention, uses a powder blend of a parent metal alloy X such as Haynes 230, a metal alloy Y that is identical to alloy X except that it is doped with another alloying element such as boron to lower its melting point, and a polymer binder. A thin layer of the powder blend is spread on a table, and a green form part is built up layer-by-layer by localized laser melting of the polymer binder; computer aided design (CAD) data is typically used to control the laser. The polymer binder is eliminated from the green part by heating in either a vacuum furnace or a furnace with an inert environment. Densification is performed at a temperature above the melting point of the lower temperature alloy, but below the melting point of the base metal alloy, to produce transient liquid sintering to near full density.

Though effective for the fabrication of three-dimensional metal parts, the method described in Bampton requires a considerable amount of complex equipment, which may be prohibitively expensive for the manufacture of simpler metal parts with surface features only.

SUMMARY OF THE INVENTION

A method of directly fabricating metal parts with surface features only is presented, which is simpler, quicker and less expensive than previously-known methods such as those described above.

A mold is made of a metal part having surface features only. A powder blend is poured into the mold, which includes a base metal, a lower melting temperature alloy of the base metal, and a polymer binder. The mold containing the powder blend is heated until the polymer binder melts and adheres the metal particles to form a green part. The green part is removed from the mold and placed in a crucible, and loose ceramic powder is packed around the part to support it. The supported green part is then heated as needed to vaporize the binder and consolidate the part via liquid phase sintering. The mold is scaled to account for the consolidation of the part. Once cool, the consolidated part can be machined to meet precise dimensional tolerances, if necessary.

The described method enables a surface-feature-only metal part to be directly fabricated in hours, rather than days or weeks. The scaled mold can be repeatedly re-used to produce additional parts if needed. No complex laser equipment is required, nor must each part be individually machined. Despite the expediency of the novel process, the finished part is tough enough to serve as, for example, a metal stamping die (after appropriate heat treatment to enhance hardness) or an electrical discharge machining (EDM) electrode.

Further features and advantages of the invention will be apparent to those skilled in the art from the following detailed description, taken together with the accompanying drawings.

DETAILED DESCRIPTION OF THE INVENTION

Figure 1:
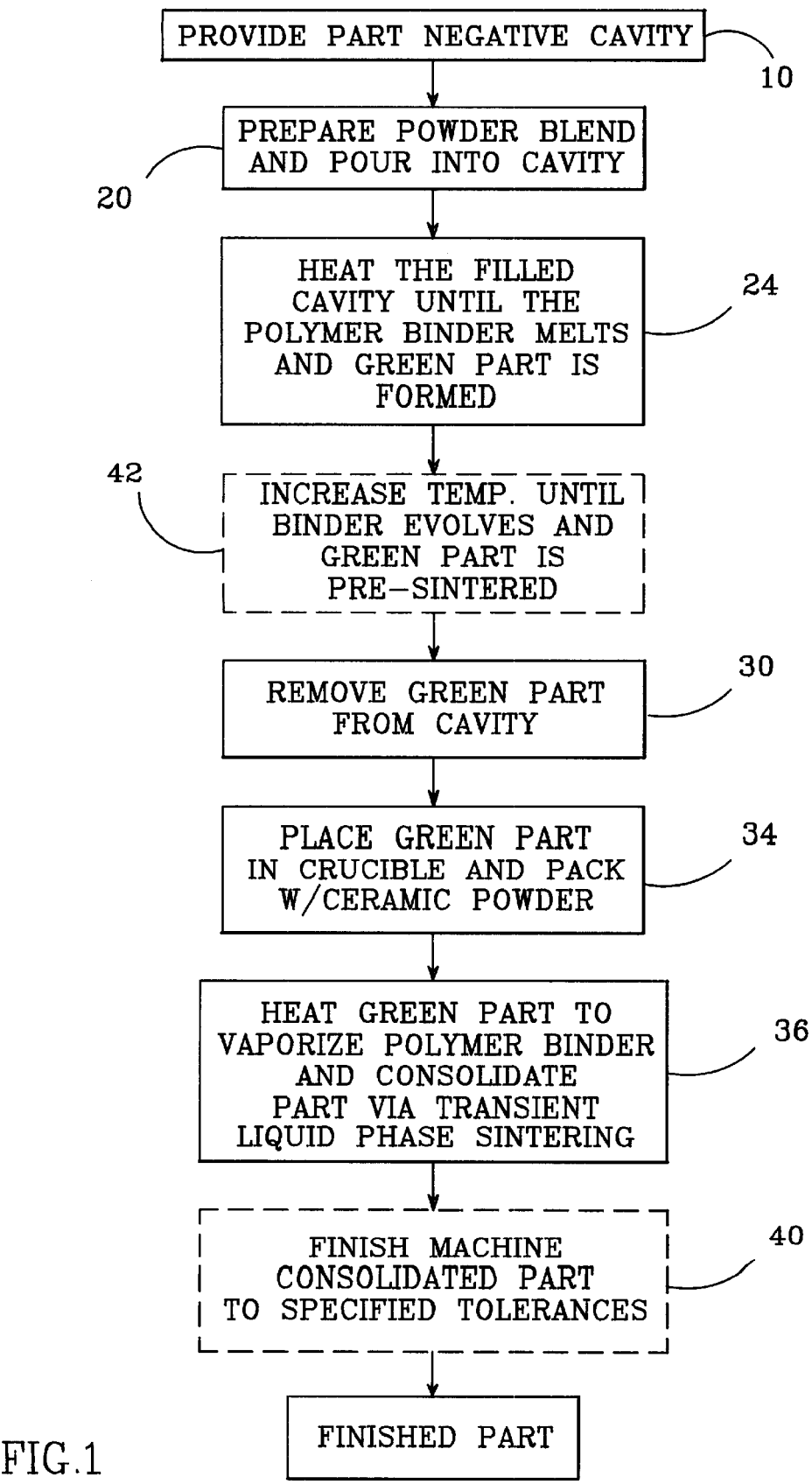
FIG. 1 is a flow chart of a direct metal fabrication process per the present invention.
Figure 2:
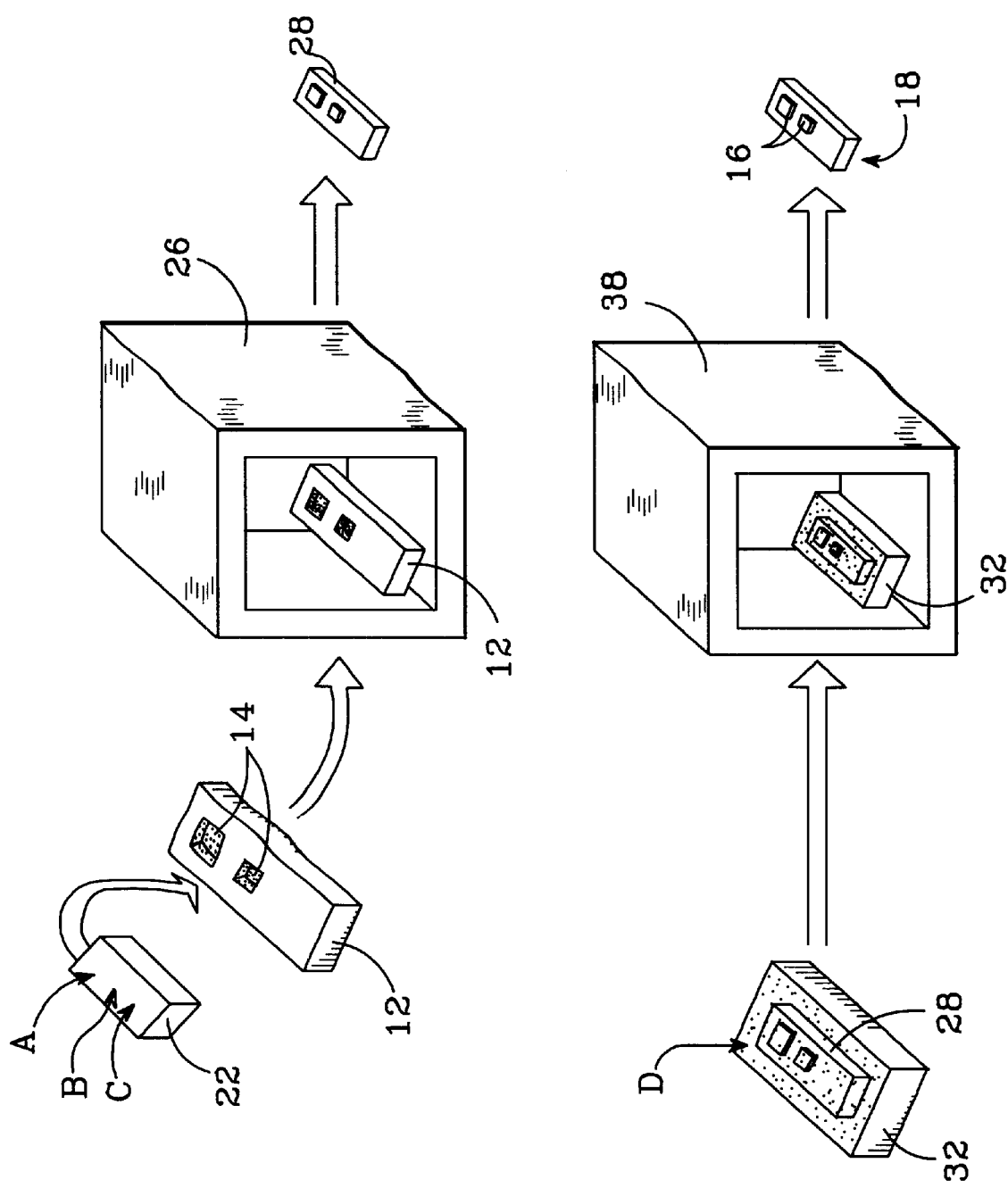
FIG. 2 is a pictorial view of a direct metal fabrication process per the present invention.

Metal parts having surface features only are easily and quickly directly fabricated in accordance with the process steps shown in FIG. 1, and illustrated pictorially in FIG. 2. In step 10, a part negative cavity 12 is provided. The cavity is a negative version of the metal part to be fabricated; i.e., depressions 14 in the part negative cavity are used to produce corresponding raised surface features 16 on the finished part 18.

A powder blend is prepared in step 20, which is made from three components, each of which, is provided in powdered form: a base metal "A", a lower melting temperature alloy of the base metal "B", and a polymer binder "C". Illustrative lists of acceptable base metals, lower melting temperature alloys and polymer binders, and the preferred size and distribution of powders in the blend, are given in U.S. Pat. No. 5,745,834 to Bampton et al., between column 3, line 51 and column 4, line 18, the disclosure of which is hereby incorporated by reference. A powder made from 17-4 ph stainless steel may also be employed. Typically, the powder blend is comprised of about 75–85% metal "A", 5–15% alloy "B", and 5–15% of polymer binder. Powders A, B and C are blended in the correct size ranges and in the correct volume fractions in a container 22, and then poured into part negative cavity 12 until full.

In step 24, the filled part negative cavity is placed into a furnace 26. The furnace atmosphere is preferably either vacuum or inert, to prevent oxidation of the part being fabricated. The temperature of the furnace is increased until the polymer binder melts and adheres the metal particles, forming a "green part" 28.

The green part 28 is removed from the part negative cavity in step 30, and is placed into a heat-resistant container 32, typically a crucible, and packed with loose ceramic powder "D", typically boron nitride, in step 34. The ceramic powder D, which should cover the green part 28, provides support for the part during the subsequent consolidation step.

In step 36, the crucible 32 and supported green part are placed in a furnace 38, the atmosphere of which is preferably vacuum or inert. The temperature of the furnace is increased to 1)vaporize the polymer binder, and 2)bring the resulting phases into a liquid/solid proportion of about 15%/85% to facilitate transient liquid phase sintering and consolidation. The furnace temperature will be on the order of 1000° C., depending on the alloy blend, which must be held for a time on the order of 1 hour, depending on the part mass. Liquid phase sintering is well known in the art of power metallurgy, and is discussed, for example, in R. M. German, *Powder Metallurgy Science*, 2nd edition, Metal Powder Industries Federation (1994), pp. 274–275.

The resulting component 18 is a near net shape metal part. Consolidation shrinks the size of the green part by a predicable amount, but in the event that precision tolerances must be met, a finish machining step (step 40) can be performed to bring the part into conformance with the tolerances.

An optional step (step 42) can be performed after the powder-filled part negative cavity is heated and the green part formed (step 24). In step 42, the furnace temperature is increased to at least 500° C. and held until all of the binder evolves (time and temperature required are material and part-size dependent). The higher temperature acts to "pre-sinter" the green part; i.e., some sintering and thus some shrinkage (<0.5%) occurs, making removal of the green part from the part negative cavity much easier. The binder, though burned out, leaves a residue that acts as a sintering aid.

It is possible to remove the green part from the cavity without it being pre-sintered, and thus it is not essential that step 42 be performed. However, without pre-sintering, the strength of the green part is low, and the probability of damaging the part is higher.

The time and temperature profile to use for the polymer binder melting and consolidation steps (steps 24 and 36, respectively), and the pre-sintering step (step 42) vary with the type of materials used; general profile guidelines are given in U.S. Pat. No. 5,745,834 to Bampton et al.

A specific example for a powder blend consisting of (90 wt % 17-4 stainless steel+10 wt % borided stainless)+10 vol % binder, is as follows:
1. Place powder-filled part negative cavity in furnace (with vacuum or inert atmosphere), raise temperature to about 200° C., and hold for about 1 hour. This melts the polymer binder and produces the green part.
2. Raise furnace temperature to about 800° C. and hold until all binder evolves (time required is part-size dependent). This step also pre-sinters the part, which improves its strength and thereby helps the part to remain intact as it is removed from the mold.
3. The part negative cavity is removed from the furnace. The green part is removed from the cavity, placed in a crucible with supporting powder, and placed back in the furnace (with vacuum or inert atmosphere). The furnace temperature is raised to sintering temperature. The rate and temperature required are the same as would be needed for a part of similar size and composition being fabricated using powder metallurgy.

The novel process enables metal parts with surface features only to be directly fabricated from a wide variety of base metals, without the use of complex laser equipment or time-consuming machining operations. The method provides a way of creating custom-designed metal parts with a quickness and economy that has heretofore been impossible. These characteristics make the described process an ideal choice for making parts such as metal stamping dies (after appropriate heat treatment to enhance hardness) and electrical discharge machining (EDM) electrodes.

As noted above, the green part will shrink somewhat during the consolidation step. The amount by which the part will shrink is preferably determined in advance, by subjecting cube-shaped test parts having precisely known dimensions to the same time and temperature profile that the green part will be subjected to. After the test parts have cooled, measurements are made of their x, y and z-axis dimensions. A range of expected shrinkage percentages is established by comparing the test parts' dimensions before and after their exposure to the consolidation profile. Consolidation shrinkage of about 14–22% is typical.

Figure 3:
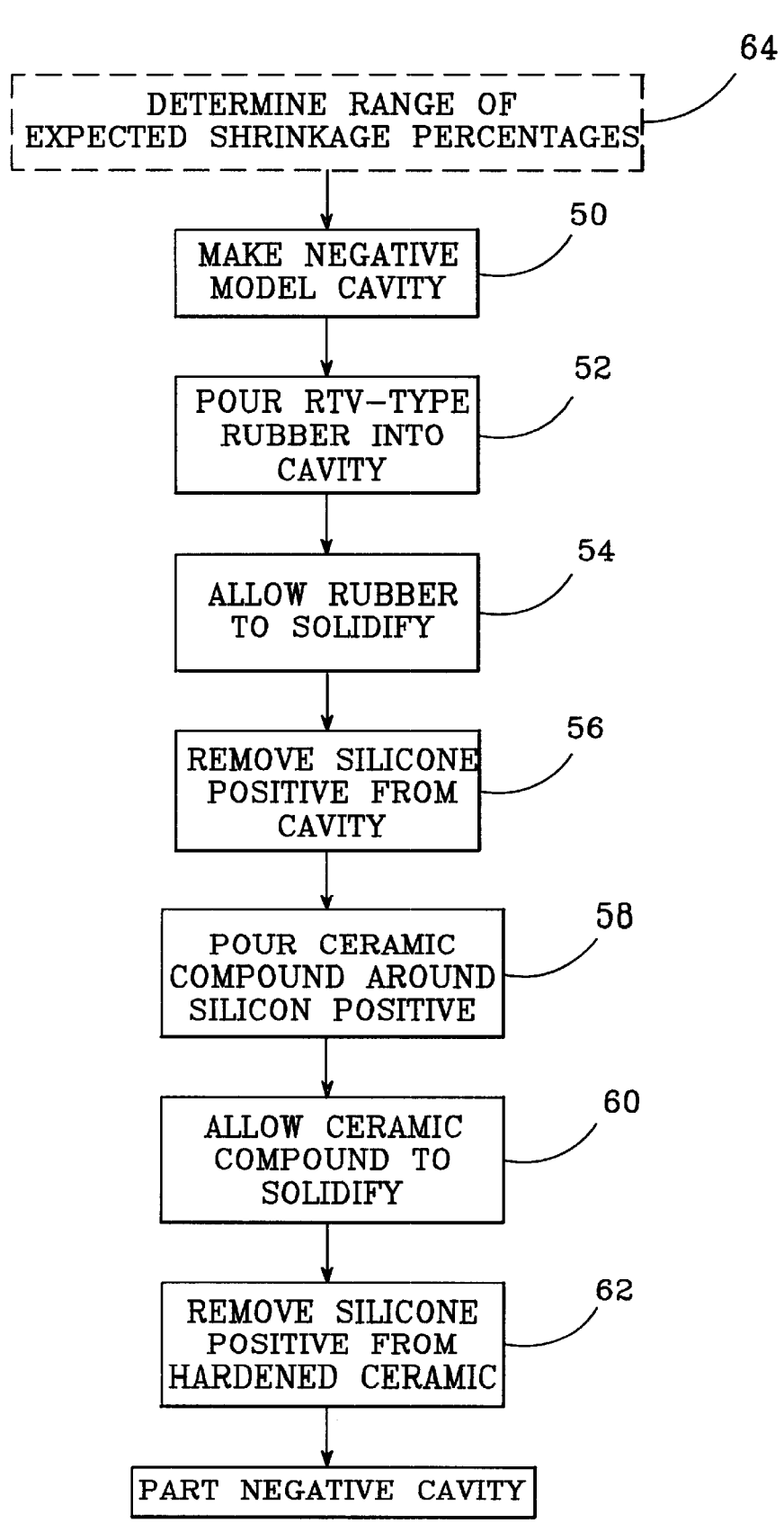
FIG. 3 is a flow chart of the process steps required to produce a negative part cavity per the present invention.

The expected shrinkage percentage is preferably taken into account when preparing the part negative cavity that will serve as the mold for the green part, with the part negative cavity being scaled up in accordance with the pre-determined percentage. An illustrative set of process steps that may be followed to produce a part negative cavity is shown in FIG. 3. In step 50, any one of a number of free form fabrication techniques, such as stereolithography (SLA), laminated object manufacturing (LOM), or selective laser sintering, for example, is used to construct a properly scaled negative model cavity of the metal part to be fabricated, using a 3-D CAD file or similar technique. A number of different materials can be used for the negative model cavity, including plastic, metal, polymer, or ceramic powders.

An RTV-type rubber is poured into the negative model cavity in step 52. The rubber is allowed to solidify (step 54), forming a silicone positive. In step 56, the silicone positive is removed from the negative model cavity. A permanent, reusable ceramic compound or equivalent is poured around the silicone positive (step 58) and allowed to solidify (step 60). The silicone positive is carefully withdrawn from the solidified ceramic mold (step 62), which can then serve as a re-usable part negative cavity for the metal part to be fabricated. The material from which the part negative cavity is made must be able to withstand the heat to which it is subjected during the polymer binder melting and consolidation steps (steps 24 and 36). In order to properly scale the part negative cavity, the range of expected shrinkage percentages is preferably determined as described above (step 64), prior to the negative model cavity's fabrication.

While particular embodiments of the invention have been shown and described, numerous variations and alternate embodiments will occur to those skilled in the art. Accordingly, it is intended that the invention be limited only in terms of the appended claims.

We claim:
1. A method of directly fabricating a metal part having no re-entrant angles at the part's side faces, comprising the steps of:

providing a part negative cavity of a metal part to be fabricated, said metal part having no re-entrant angles at the part's side faces;

pouring a powder blend into said part negative cavity, said powder blend comprising:
a base metal in powder form,
a lower melting temperature alloy of said base metal in powder form, and
a polymer binder in powder form;

heating said part negative cavity until said polymer binder melts and adheres the metal particles to form a green part, said step of heating of said part negative cavity performed immediately after said step of pouring said powder blend into said cavity;

removing said green part from said part negative cavity;

placing said green part in a heat-resistant container and packing loose ceramic powder around it to provide support; and heating said green part to vaporize said binder and consolidate said part via transient liquid phase sintering.

2. The method of claim 1, wherein said part negative cavity is scaled to account for said consolidation of said part.

3. The method of claim 2, further comprising the steps of:

subjecting a cube-shaped test part having known dimensions to the same time and temperature profile that said green part will be subjected to during said consolidation step;

measuring the x, y and z dimensions of said test part after said test part has cooled; and comparing said known dimensions with said measured dimensions to establish a range of percentages by which said green part can be expected to shrink during said consolidation step, said part negative cavity scaled to account for an amount of shrinkage falling within said range of percentages.

4. The method of claim 1, wherein said base metal comprises about 75–85% of said powder blend, said lower melting temperature alloy of said base metal comprises about 5–15% of said powder blend, and said polymer binder comprises about 5–15% of said powder blend.

5. The method of claim 1, wherein said polymer binder comprises a nylon polymer.

6. The method of claim 1, wherein said step of heating said green part to consolidate said part via liquid phase sintering comprises heating said green part until its phases are about 15% liquid/85% solid to facilitate liquid phase sintering.

7. The method of claim 1, wherein said step of providing a part negative cavity comprises the steps of:

making a negative model cavity scaled to account for the consolidation expected during said step of heating said green part;

pouring an RTV-type rubber into said negative model cavity;

allowing said rubber in said negative model cavity to solidify to form a silicone positive;

removing said silicon e positive from said negative model cavity;

pouring a ceramic compound around said silicone positive and permitting said ceramic compound to harden; and withdrawing said silicone positive from said hardened ceramic compound, said hardened ceramic compound forming said part negative cavity.

8. The method of claim 7, further comprising the steps of:

subjecting a cube-shaped test part having known dimensions to the same time and temperature profile that said green part will be subjected to during said consolidation step, measuring the x, y and z dimensions of said test part after said test part has cooled, and comparing said known dimensions with said measured dimensions to establish a range of percentages by which said green part can be expected to shrink during said consolidation step, said part negative cavity scaled to account for an amount of shrinkage falling within said range of percentages.

9. The method of claim 1, wherein said metal part to be fabricated is a metal stamping die.

10. The method of claim 1, wherein said metal part to be fabricated is an electrical discharge machining (EDM) electrode.

11. The method of claim 1, wherein said heating steps are performed in an inert atmosphere to reduce oxidation of said metal part.

12. The method of claim 1, wherein said heating steps are performed in a vacuum furnace to reduce oxidation of said metal part.

13. The method of claim 1, further comprising the steps of allowing said consolidated part to cool and machining said cooled consolidated part to bring its dimensions into conformance with specified tolerances.

14. The method of claim 1, further comprising the step of heating said green part until said polymer binder evolves and said green part is at least partially sintered such that some shrinkage of said green part occurs, said shrinkage making it easier to remove said green part from said part negative cavity.

15. A method of directly fabricating a metal part having no re-entrant angles at the part's side faces, comprising the steps of:

providing a part negative cavity of a metal part to be fabricated, said metal part having no re-entrant angles at the part's side faces;

pouring a powder blend into said part negative cavity, said powder blend comprising:
a base metal in powder form,
a lower melting temperature alloy of said base metal in powder form, and
a polymer binder in powder form;

heating said part negative cavity until said polymer binder melts and adheres the metal/particles to form a green part;

heating said green part until said polymer binder evolves and said green part is at least partially sintered such that some shrinkage of said green part occurs;

removing said green part from said part negative cavity;

placing said green part in a heat-resistant container and packing loose ceramic powder around it to provide support; and heating said green part to vaporize said binder and consolidate said part via transient liquid phase sintering.

16. A method of directly fabricating a metal part having no re-entrant angles at the part's side faces, comprising the steps of:

providing a part negative cavity of a metal part to be fabricated, said metal part having no re-entrant angles at the part's side faces;

pouring a powder blend into said part negative cavity, said powder blend comprising:
a base metal in powder form,
a lower melting temperature alloy of said base metal in powder form, and
a polymer binder in powder form;

heating said part negative cavity until said polymer binder melts and adheres the metal particles to form a green part, said green part formed without compacting said powder blend;

removing,said green part from said part negative cavity;

placing said green part in a heat-resistant container and packing loose ceramic powder around it to provide support; and heating said green part to vaporize said binder and consolidate said part via transient liquid phase sintering.

* * * * *